United States Patent
Felber

(10) Patent No.: US 8,651,532 B2
(45) Date of Patent: Feb. 18, 2014

(54) DEVICE FOR CONNECTING TWO PIPES WITH DIFFERENT EXTERNAL DIAMETERS

(76) Inventor: Winfried Felber, Monheim (DE)

( * ) Notice: Subject to any disclaimer, the term of this patent is extended or adjusted under 35 U.S.C. 154(b) by 269 days.

(21) Appl. No.: 12/314,946

(22) Filed: Dec. 19, 2008

(65) Prior Publication Data
US 2009/0160183 A1    Jun. 25, 2009

(30) Foreign Application Priority Data
Dec. 19, 2007   (DE) .......................... 10 2007 061 288

(51) Int. Cl.
*F16L 21/00*    (2006.01)

(52) U.S. Cl.
USPC ........................................ 285/236; 285/417

(58) Field of Classification Search
USPC ........... 285/236, 148.23, 148.26, 148.18, 417
See application file for complete search history.

(56) References Cited

U.S. PATENT DOCUMENTS

| | | | |
|---|---|---|---|
| 3,104,898 A * | 9/1963 | Mac Donald et al. ........ | 285/236 |
| 3,430,989 A * | 3/1969 | Wendt ............................ | 285/110 |
| 3,529,854 A * | 9/1970 | Thomas ........................ | 285/322 |
| 3,801,141 A * | 4/1974 | Hollingsworth .............. | 285/236 |
| 4,101,151 A * | 7/1978 | Ferguson ..................... | 285/236 |
| 4,186,948 A * | 2/1980 | Cronk ...................... | 285/148.26 |
| 4,380,348 A * | 4/1983 | Swartz .......................... | 285/236 |
| 4,491,350 A * | 1/1985 | Wolf et al. .................... | 285/236 |
| 4,538,839 A * | 9/1985 | Ledgerwood ................. | 285/236 |
| 4,564,220 A * | 1/1986 | Sills et al. .................... | 285/236 |
| 4,583,770 A * | 4/1986 | Kreku et al. ............. | 285/148.26 |
| 5,039,137 A * | 8/1991 | Cankovic et al. ............. | 285/236 |
| 5,431,458 A * | 7/1995 | Schaub et al. ................ | 285/236 |
| D609,789 S * | 2/2010 | Milnes ......................... | D23/262 |
| 7,770,941 B2 * | 8/2010 | Ward ............................ | 285/419 |
| 2005/0099003 A1 * | 5/2005 | Tarara ........................... | 285/236 |

FOREIGN PATENT DOCUMENTS

DE             4241622 A1 *   6/1994 ............. F16L 27/12

\* cited by examiner

*Primary Examiner* — Aaron Dunwoody
(74) *Attorney, Agent, or Firm* — Bacon & Thomas, PLLC

(57) ABSTRACT

A device for connecting two pipes with different external diameters using a sleeve arrangement which bridges the butt joint between the ends of the pipe facing each other. The device contains at least a fixing sleeve which can take up the clips for the two pipes, and, if necessary, a sealing sleeve which is surrounded by the fixing sleeve. High economy and safety can be achieved by the fact that each sleeve of the sleeve arrangement has cylindrical contact sections which can be adjusted to the different external diameters of the two pipes and are connected by a central section which can take a conical form to suite the diameter difference wherein the contact sections of the sleeve next to the external circumference of the two pipes can be brought into direct contact with the two pipes, and the contact sections of the fixing sleeve contain encircling mounting channels assigned to the clips, and wherein the fixing sleeve takes the form of a closed encircling ring which is suitable for three-dimensional deformation.

19 Claims, 9 Drawing Sheets

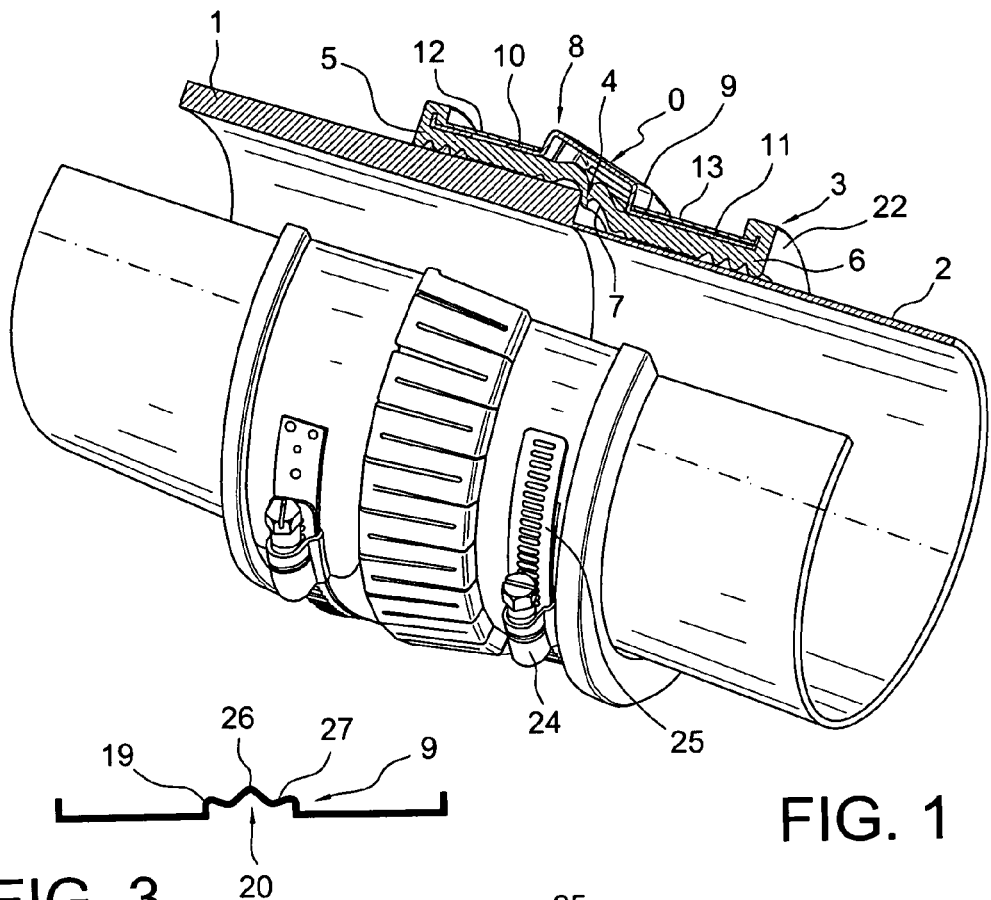
FIG. 1
FIG. 3
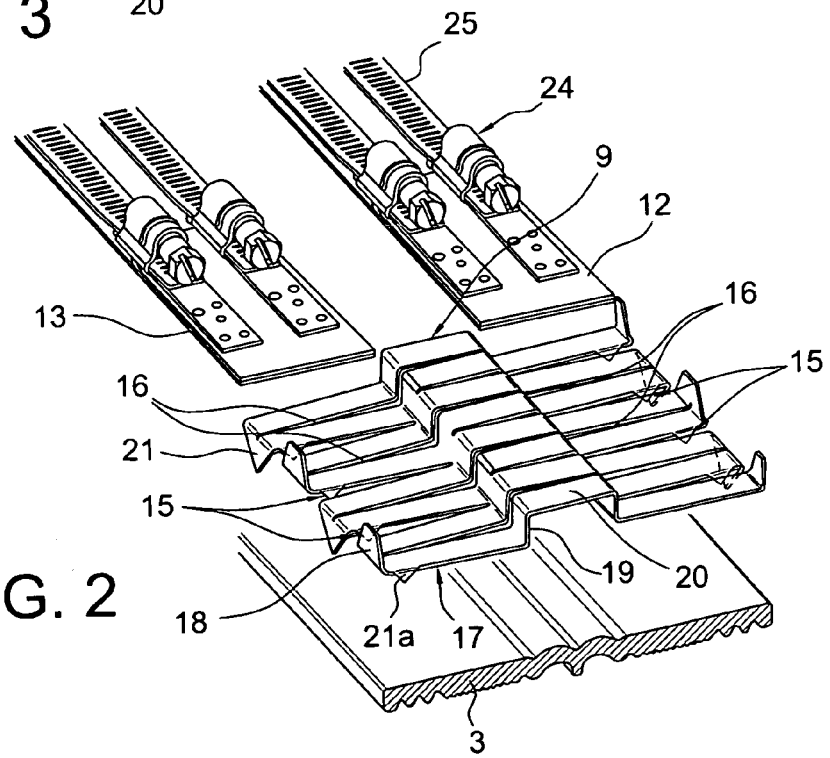
FIG. 2

DEVICE FOR CONNECTING TWO PIPES WITH DIFFERENT EXTERNAL DIAMETERS

FIELD OF THE INVENTION

The invention relates to a device for connecting two pipes with different external diameters with a sleeve arrangement which bridges the butt joint between the ends of the pipe facing each other and contains at least a fixing sleeve which can take up encircling clips assigned to the two pipes and if necessary a sealing sleeve which is surrounded by the fixing sleeve.

BACKGROUND OF THE INVENTION

The need to connect lines, in particular pipes with different external diameters, comes about if pipes are found with different wall thicknesses, for example made of different materials, a situation which often occurs in the waste water and sanitary field. In arrangements of the type mentioned above used in the past have used compensating rings which have compensated for the diameter difference between the two pipes. However, this has proved to be both complicated and uneconomical since different compensating rings have had to be kept at the ready for different diameter differences. The compensating rings are located in a radial position inside the sealing sleeve and can therefore also have an adverse effect on the seal of the connection.

U.S. Pat. No. 4,380,348 and U.S. Pat. No. 4,186,948 propose pipe connections with a fixing sleeve which is based on a strip with overlapping ends. Although the overlapping ends can move towards each other, it is not possible to achieve a targeted spatial deformation process to adjust to the different external diameters of the pipes that are to be connected due to a lack of suitable three-dimensional deformation capacity, particularly in the central section of the fixing sleeve. The conventional arrangements are therefore not suitable for connecting two pipes with different external diameters.

On this basis, therefore, the aim of this invention is to improve a device of the type mentioned above using simple and low cost equipment so that compensating rings are no longer required, yet nevertheless a high level of safety and accuracy can be achieved.

SUMMARY OF THE INVENTION

This aim is solved by the invention in such a way that each sleeve in the sleeve arrangement has cylindrical contact areas for the two pipes which can be adjusted to the different external diameters of the pipes and are connected by a central section which can be shaped into a conical form to suit the diameter difference wherein the contact sections of the sleeve nearest to the external circumference of the two pipes can be brought into direct content with the pipes and the contact sections of the fixing sleeve contain encircling mounting channels assigned to the clips and wherein the fixing sleeve takes the form of a closed encircling ring which is suitable for a three-dimensional shape change.

These measures ideally produce a variable diameter sleeve arrangement which can be adjusted to various diameter sizes. This therefore ensures that the device proposed by the invention is suitable for several applications which simplifies stocks and makes for the rational production of large quantities. Since compensating rings are not required, the sealing sleeve or a seal used instead of it is in direct contact with the external circumference of the two pipes which reliably prevents leaks. In addition the design of the fixing sleeve proposed by the invention with its cylindrical contact sections which can be adjusted to different diameters and its conical adjusting central section ensures reliable self-centering and a reliable transfer of lateral forces. The measures proposed by the invention completely eliminate the disadvantages of the conventional arrangements mentioned above.

In a beneficial design the ring which forms the fixing sleeve takes the form of a spring cage which has slots which run in an axial direction distributed around its circumference assigned to the central section and the contact sections on both sides which allow both expansion and compression. These measures produce a slot arrangement both in the central section and in the side contact sections which benefits the required spatial movement and therefore the space giving deformation capacity to adjust to different pipe diameters. The surrounding spring cage is a robust component which is easy to fit.

The expansion and compression slots may easily take the form of edge notches on both sides overlapping in the central section. An ideal arrangement may be that the spring cage has edge notches on both sides distributed over its circumference which extend to the central section and alternating with these, internal slots which are closed at the edge but at least extending over a large part of the central section, ideally over the entire central section wherein the edge notches on one side may be arranged opposite the internal slots on the other side. These measures ensure a high level of stability. Nevertheless they also provide the required three-dimensional arrangement.

Another beneficial measure may be that the edge notches form axial projections which are separated from each other and which have an end piece which has a radial extension at the axial outer ends which closes the corresponding internal slot. The end pieces ideally not only allow the formation of the encircling channels assigned to the clips but ideally also a positive connection to a sealing sleeve so that when the fixing sleeve undergoes deformation, the sealing sleeve moves with it due to the way it is secured.

In a preferred version of the main measures, the central section of the fixing sleeve may be raised against the side contact sections and connected to it by side target bending areas or joints. These measures benefit the required conical adjustment of the central section.

Another preferred version of the main measures may be that at least the slots which extend over the central section of the fixing sleeve are bridged by a bellows-type membrane and that to each contact section a seal is assigned projecting out of the central section coming to rest on the appropriate pipe. The membranes close the relevant expansion slots without having an adverse effect on the movement produced by the expansion and compression slots. The central section of the fixing sleeve which bridges the butt joint area between the two pipes can be sealed easily by the seals assigned to the contact sections and which come into contact with the pipes. This means that there is no need for a sealing sleeve. Nevertheless a well sealed arrangement can be achieved. In accordance with the first version only the internal slots can be bridged by a bellows-type membrane wherein a meandering sealing cord may be fitted between the internal slots bridged by a membrane and the open edge notches. Another version may be that all the expansion slots formed by the edge notices and internal slots are bridged by a bellows-type membrane wherein a surrounding sealing ring is fitted in a channel in the area of the ends of the side contact sections away from the central section, and this is against the neighbouring face sides of the membranes open on the channel side.

In another development of the main measures, the spring cage which forms the fixing sleeve may consists of several ring segments which can be combined to form a ring wherein the central sections and the axial projections of neighbouring ring segments can be connected by means of connections with ideally perpendicular connectors and preferably can also be locked together. The sleeve size can ideally be varied in this respect by using more or fewer encircling segments. Since the same encircling segments can be used at all times, this results in particularly high quantities and therefore particularly low cost production and simple stock management.

Similar benefits are also produced by the beneficial versions described below. The fixing sleeve may take the form of encircling segments which can connect to each other in the encircling direction with rotary freedom around a radial axis. These measures produce an alternative to the spring cage. Since the encircling segments can be rotated relative to each other, the counter force that acts on the clips is beneficially reduced so that the sealing sleeve can be reliably pressed using the clips so as to ensure a good seal. Nevertheless only a comparatively low clamping force of the clips is required which means that the number of them can be reduced. The encircling segments can beneficially feature a raised central web thus making it possible to connect them to each other to form a rotary joint in the encircling direction. The connection ensures simply assembly. Ideally target bending areas should be used to form side wings connected to the central web, projecting sideways from the central web which, as a result of the connection movement, can engage in each other similar to meshing. This produces reliable, large area contact with the sealing sleeves which is made of rubber or a rubber-like material.

Another particularly preferred measure may be that the clips assigned to the contact sections of the fixing sleeve consists of at least two segments which together produce an arc angle of more than 360° wherein a segment near one end is fitted with the securing straps surrounding the other segment and with the holders or clamps assigned to the opposite free ends of the securing straps. These measures ideally prevent a fibre forming near the clips and therefore benefit the uniform radial movement over the entire circumference. This benefits the achievement of the precise alignment of the pipes which are to be connected.

Other beneficial versions and expedient developments of the main features are described in the example description below based on the drawings. The drawings described below show the following:

BRIEF DESCRIPTION OF THE DRAWINGS

FIG. 1 A pipe connection as proposed by the invention with a fixing sleeve in the form of an encircling spring cage in a section view.

FIG. 2 A detailed view of the arrangement shown in FIG. 1 in an exploded view.

FIG. 3 A cross-section of a preferred version of the fixing sleeve.

DESCRIPTION OF PREFERRED EMBODIMENTS

Figure 4:
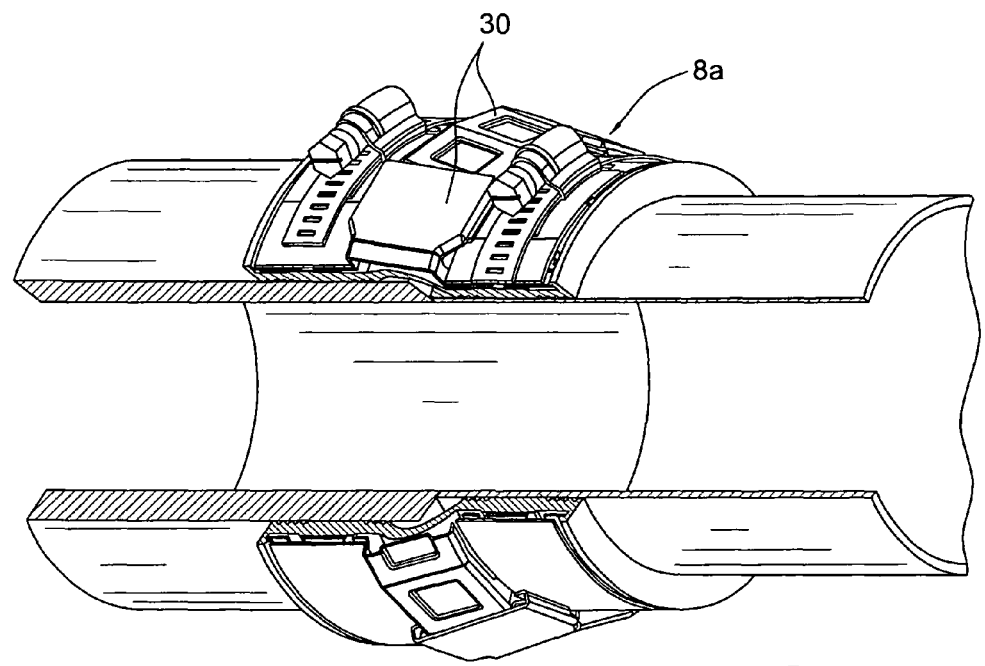
FIG. 4 A pipe connection as proposed by the invention with a fixing sleeve formed by inter-connected encircling segments in a section view.

The main area of application of the invention is the waste water and sanitary field since it is often necessary in this field to connect pipes made of different materials to each other and therefore, whilst they may have the same internal diameter, they have different external diameters. However, the invention is not restricted to this field.

The example shown in FIG. 1 is based on a connection between a stoneware pipe 1 and a plastic pipe 2 which has a much smaller wall thickness. The pipes 1, 2 have the same internal diameter and are placed against each other coaxially. As a result of their different wall thicknesses, the area around the butt joint forms an external step around the circumference.

The pipes 1, 2 in the example shown are joined with a butt connection to make the drawing clearer. In practice, however, a small expansion gap must be provided. To ensure the requisite seal around the joint, in the example shown there is a sealing sleeve 3 made of rubber or rubber-type material which is drawn over the two pipes 1, 2 with its ends facing each other and is spanned over the butt joint area. The sealing sleeve 3 is expediently fitted with a stop 4 formed by an internal collar which can be brought to rest on the front of the thicker pipe, in this case the stoneware pipe 1.

The sealing sleeve 3 contains side contact sections 5, 6 with a cylindrical configuration assigned to the pipes 1, 2 which are in direct contact with the external surface of the pipe assigned to each of them, in other words without any compensating rings being inserted between the two. The side contact sections 5, 6 are connected by a slightly weakened (to enable it to undergo deformation) central section with curves which flank the stop 4 and follow a radial direction outwards. This central section is deformed conically in accordance with the difference between the external diameters of the pipes 1, 2. The diameter of the contact sections 5, 6 which can be pulled over the pipes 1, 2 adjusts to the corresponding pipe diameter starting from a mid value by means of either expansion or compression. However, it is also conceivable that the sealing sleeve 3 can be compressed to the smaller diameter starting from a larger diameter.

On the external circumference of the sealing sleeve 3 there is a encircling fixing sleeve 8 made of a metal material and/or plastic which stabilises the pipe connection, in other words it ensures the coaxial nature of the pipes 1, 2 and can transfer lateral forces. The fixing sleeve 8 has a central section 9 which encircles the central section 7 of the sealing sleeve 3 and which has been deformed into a conical section in the fitted configuration shown in the drawing and, connecting to the side of this, it has side contact sections 10, 11 which are assigned to the contact sections 5, 6 of the sealing sleeve 3. Encircling clips 12, 13, which can be inserted into mounting channels formed by the contact sections 10, 11 of the fixing sleeve 8, are provided to secure the fixing sleeve 8 and compress the sealing sleeve 3.

The fixing sleeve 8 may take the form of a ring-shaped encircling spring cage, in other words a socket or ring spring which is designed for three-dimensional deformation. The spring cage which forms the fixing sleeve 8 is made of a strip-shaped semi-finished product in the example shown in FIGS. 1 and 2 which have been bent into a ring and whose ends have been connected to each other, ideally by means of welding them to each other. The strip-shaped semi-finished product may be made of metal and/or plastic stampings or injection mouldings. The spring cage which forms the fixing sleeve 8 has axial slots in the following named as expansion slots distributed uniformly over its circumference which can provide adequate space for the required three-dimensional deformation capacity. The term expansion slots should be understood in such a way that both expansion and compression is possible. Since this deformation capacity must be provided over the full axial length of the fixing sleeve 8 as it adjusts to the different external diameters of the pipes 1, 2 which are to be joined together, axial expansion slots are provided which are assigned to the central section 9 and the side contact sections 10, 11. These may either be identical or different expansion slots.

In the version shown in FIG. 2 the ring which forms the fixing sleeve 8 has edge notches 15 distributed uniformly over its circumference, which are open at the edge and extend to the central section 9 forming first expansion slots, which are arranged alternately with parallel internal slots 16 which form second expansion slots and are closed at both ends. As can be seen in FIG. 2, the internal slots 16 extend beyond the central section 9 at least over the majority of the central section 9 and ideally over the entire central section 9 and to the edge of the contact sections 10, 11 so that sufficient space can be provided for the required three-dimensional deformation over the entire axial length of the fixing sleeve 8. The formation is ideally point-symmetrical relative to a central radial plane so that each side can be expanded or contracted and therefore can be assigned to the larger or smaller external diameter, thus making installation easier. The edge notches 15 form side projections 17, in other words projections which run in the axial direction when the sleeve is in place, which are split into two branches by the internal slots 16, which are joined at the edge by a lug-type end piece 18.

Figure 8:
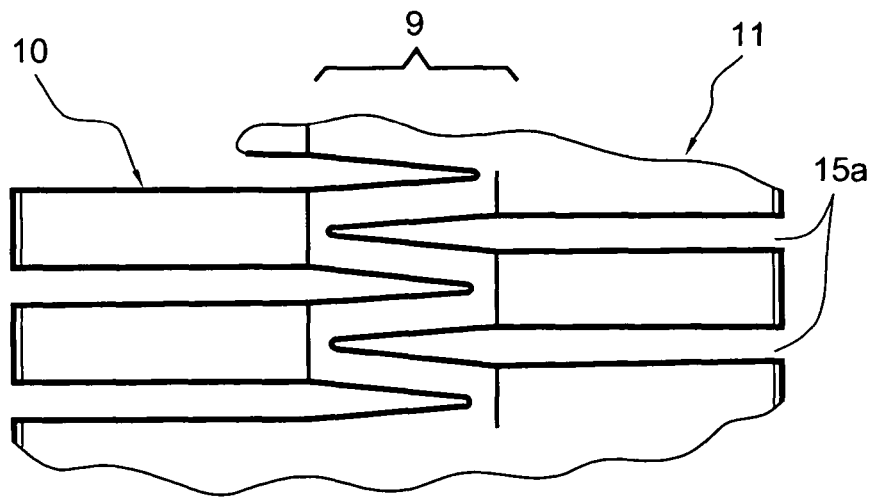
FIG. 8 A schematic view of a version with expansion slots formed only by edge notches.

The version shown in FIG. 2 with edge notches 15 and internal slots 16 is a particularly preferred version. For simplification purposes, however, it would also be conceivable only to use the expansion slots formed by the edge notches. An alternative of this nature is shown in FIG. 8. In this case the ring which forms the fixing sleeve has axial edge notches 15*a* at both sides which extend over a side contact section 10 or 11 and the central section 9 wherein the opposite edge notches 15*a* assigned to the two sides are offset to each other by in the encircling direction by around one-half of the distance between neighbouring edge notches so that the required overlapping or meshing is possible in the central section 9.

In FIG. 2 the edge notches 15 are constricted inwards in a V shape starting from the side edge. The internal slots 16 have the largest clearance where the edge notches 15 have the smallest clearance. The internal slots are therefore constricted into a V shape from both sides by the axial section of the inner end of the edge notches 15. The V-shaped configuration of the edge notches 15 and internal slots 16 allows the requisite diameter contraction around the thinner pipe. The edge notches 15 and internal slots 16 on the two sides of the spring cage which is formed by the fixing sleeve 8 in this case are offset to each other in such a way that the edge notches 15 on one side are opposite the internal slots 16 on the other side. The ends of the opposite edge notches 15 and internal slots 16 which are opposite each other are therefore close together.

The central section 0 of the spring cage which forms the fixing sleeve 8 is raised in a portal shape, as shown in FIGS. 1 and 2 so as to produce raised side edge webs 10 which are bridged by a central web 20. The edge notches 15 end at the bottom end of these, ideally at a short distance from them. The opposite internal slots 16 end at the top end of the edge webs 19. The distance between the ends of the opposite edge notches 15 and internal slots 16 which face each other should only correspond to the width of the edge web 19. Ideally the internal slots 16 are slightly shorter and end near the central section 9.

The lug-type end pieces 18 mentioned above which limit the internal slots may be bent over radially to form radial projections. In the example shown in FIG. 2, the consecutive end pieces 18 are alternately bent radially inwards and outwards. The projections pointing radially inwards thus formed may preferably take the form of pointed teeth 21 which can be brought into contact with the external surface of the pipe to which they are assigned which means that a joint with tensile strength can be produced. The projections pointing radially inwards may grip the sealing sleeve 3 at their axial ends or engage in recesses in the sealing sleeve 3 but which are not shown in FIG. 2. The projections pointing a radial direction outwards may ideally be brought into contact with the sealing sleeve 3 to help the coaxial alignment of the two sides of the fixing sleeve 9. For this purpose the sealing sleeve 3, as shown in FIG. 1, may have a collar 22 projecting radially outwards which has an L-shaped slot in its cross-section starting from the nearby support section into which the projections which point radially outwards can engage. The projections which point radially outwards also form the mounting channels for the clips 11, 12 together with the parallel edge webs 19 in the central section 9.

In the example shown, as FIG. 2 shows, there are tooth-shaped projections 21*a* pointing radially inwards in the axial end section of the side edges of the projections 17. These are designed to press into the sealing sleeve 3 and therefore ensure the uniform deformation of the sealing sleeve 3 and the fixing sleeve 8. The redirection of the projection formed by the end pieces 18 mentioned above and in particular their engagement into corresponding recesses are designed for the same purpose.

As mentioned above, the central section 9 of the spring cage which forms the fixing sleeve 8 is ideally raised in a portal shape so that the side webs 19 projecting in a radial direction limit the mounting channels for the clips 12, 13 together with the parallel external projections 18. The kinking edges between the side webs 19 and the projections 17 and between the side webs 19 and the central webs 20 may take the form of target bending areas achieved by being suitably weakened.

The clips 12, 13 are formed by encircling strips made of sheet metal or plastic whose overlapping ends on the one side have at least one clamp, here in the form of a drive organ 24 which can be controlled by a screw head, for example in the form of a rotating worm, and on the other side have a securing strap 25 which has toothed rack section which can be engaged with the clamp or drive organ 24. As indicated in FIG. 1, at least one drive organ 24 and one securing strap 25 are provided for each clip 12, 13. Naturally, however, several of these securing devices may be fitted next to each other, as shown in FIG. 2.

Figure 9:
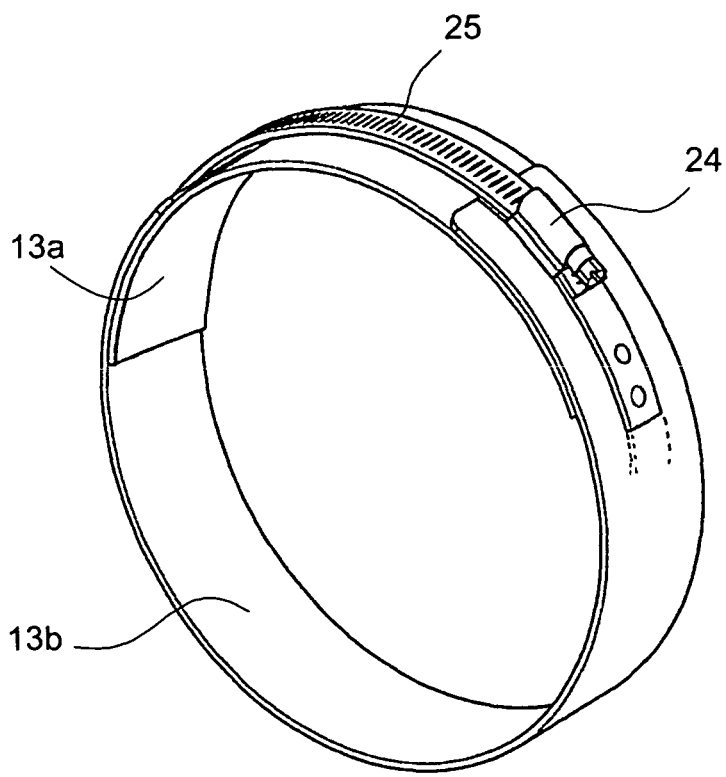
FIG. 9 A view of a multi-part clip.

The clips 13 may be formed by a single part which encircles the full circumference. Ideally, however, the clips 12, 13 have several parts, as indicated in FIG. 9. The clip shown in FIG. 9 consists of two ring segments 13a, 13b, which are fitted next to each other and together produce an arc angle of more than 360° so that the opposite ends can overlap. The securing strap 25 and the corresponding drive organ 24 are only assigned to one segment, in showed embodiment to ring segment 13b. Ring segment 13a is fitted in ring segment 13b and encircled by the securing strap 25. When the securing strap 25 is tightened, the overlapping ends of the ring segments 13a, 13b slide against each other, which retains the circular configuration of the entire ring and counteracts the elongation of the securing strap 25 in the form of a chord. The measures described above therefore help to achieve the precise alignment of the pipes 1, 2 which are to be connected.

Figure 10:
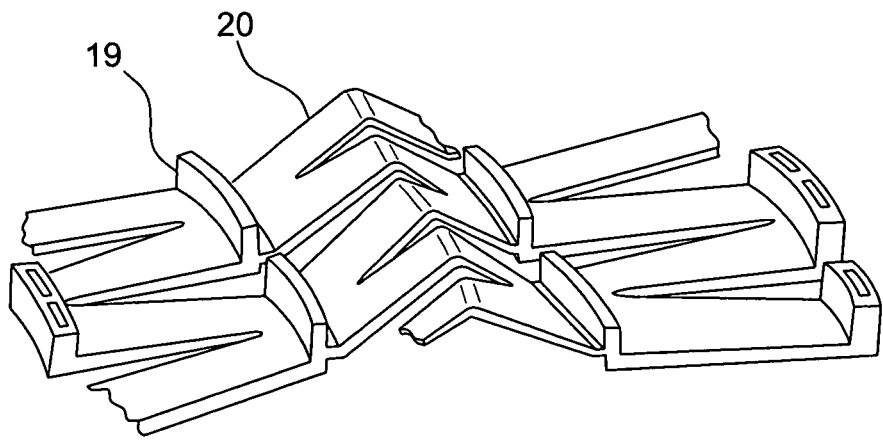
FIG. 10 An alternative to the cross-section shown in FIG. 3.

In the version shown in FIGS. 1 and 2 the central web 20 on the central section 9 of the spring cage takes the form of a flat lug. However, ideally a shape as shown in FIG. 3 may be used. In this case the central web 20 has a central raised comb section 26 which is flanked by two inwardly curved side sections 27 which are tailored to the curved sections 7 of the sealing sleeve and can hold this in position when assembled without exerting undesirable shearing forces on the sealing sleeve 3. In FIG. 3 the side web 19 and the central web 20 are connected at their ends, a situation which is produced automatically by a stamped version. For a moulded or cast version the shoulder of the central web 20 could be placed lower as indicated in FIG. 10. The height of the side web 19 in this case corresponds to the required height to form a channel suitable for the relevant clip or clips. The central web 20 connects to the side web 19 almost level with the base of this channel. A version of this type would help the reliable transfer of shearing forces. In the shoulder area of the central web 20, it would also be possible to provide a suitably weakened area, etc. to form target bending areas of the type mentioned above.

Figure 5:
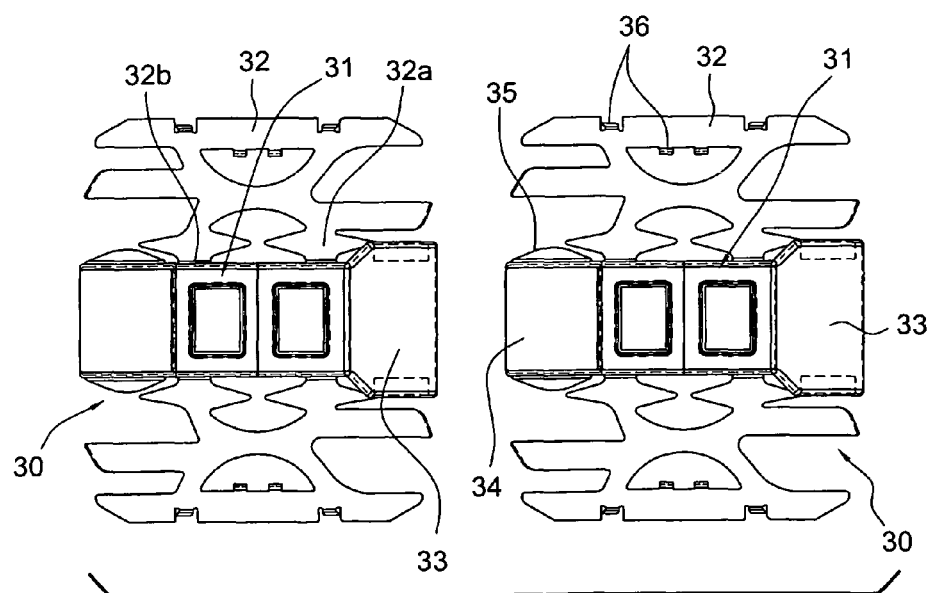
FIG. 5 A plan view of two consecutive encircling segments of the arrangement in FIG. 4.

The basic structure of the version described below and shown in FIGS. 4 and 5 is identical to the basic structure of the example described above and shown in FIGS. 1 to 3. Therefore the following will predominantly describe the differences. In the example shown in FIGS. 4 and 5 the fixing sleeve 8a consists of encircling segments 30 which are arranged around the circumference and can be rotated relative to each other around a radial axis and therefore have freedom of rotational movement. These can be connected to each other in a rotational configuration by the end sections which face each other and therefore form a closed encircling ring. In the example shown the encircling segments 30 arranged around the circumference can be connected to each other by the end sections which face each other.

The encircling segments 30 have a central web 31 which, when the segments are in their assembled position, form a conical central section of the fixing sleeve 8a from which, as can best be seen in FIG. 5, side wings 32 project pointing in an axial direction. The encircling segments 30 can be connected to each other in the area of their central webs 31 which are ideally reinforced by having an appropriate shape, such as beads, etc. The side wings 32 may have edge sections on their axial edges which engage in each other like meshing when connected. The central webs 31 are fitted with a connecting socket 33 on the one side and a corresponding connecting tongue 34 on the other side so that consecutive encircling segments 30 can be connected to each other by inserting the connecting tongue 34 into the neighbouring connecting socket 33. The connecting tongues 34 have side flanks 35 which are curved convexly so that a type of joint connection is produced wherein the connecting tongues 34 are in contact in any rotational position with two points on opposite flanks of the corresponding connecting socket 33. The side wings 32 may be fitted with radial protections 36 formed by bent lugs wherein the projections 36 which point radially outwards form mounting channels for the clips 12, 13 and the projections 36 which point radially inwards hold the side of the sealing sleeve 3 and/or may be brought into contact with the appropriate pipe. The maximum possible pivot angle can be limited by stops.

The encircling segments 30 which form the fixing sleeve 8a are ideally made of metal stampings. It is also conceivable that they could be made of plastic injection mouldings or so. In any event the side wings 32 must be perforated or recessed so that they connect to the central web 31 with narrow webs 32a. The narrow webs 32a form the required target bending areas. To enhance this effect the webs 32a may have weakened areas 32b at their ends near the central section.

It is also conceivable that a spring cage can be formed by several inter-connecting ring segments in the manner shown in FIGS. 1 and 2. A version of this type is shown in FIGS. 6 and 7.

Figure 6:
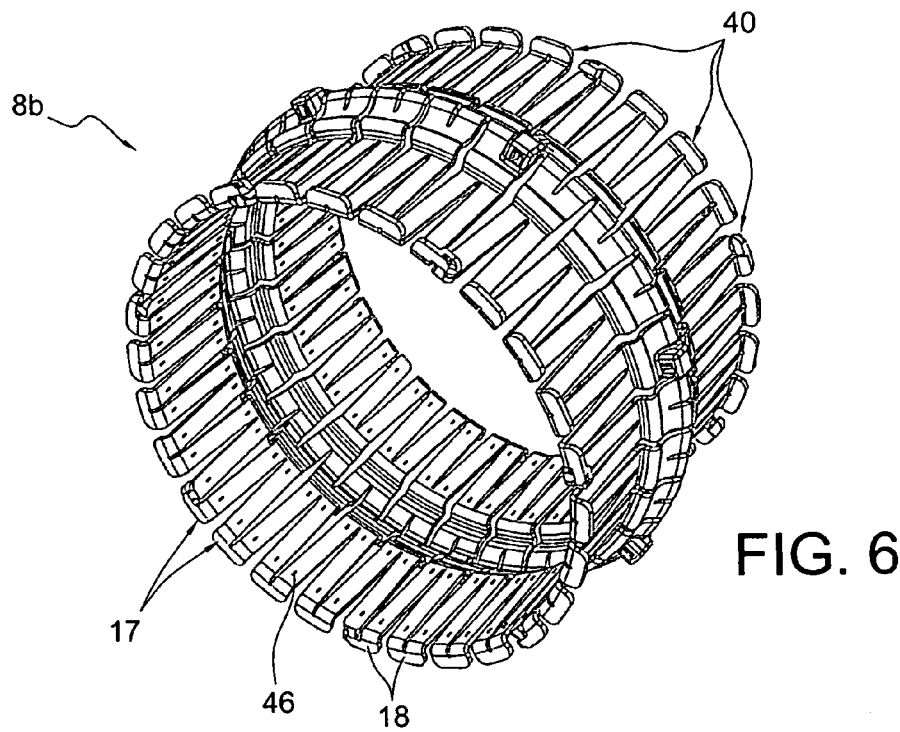
FIG. 6 A perspective view of a spring cage formed by inter-connected ring segments.

FIG. 6 shows a perspective view of a fixing sleeve 8b formed by an encircling spring cage wherein the spring cage consists of several ring segments 40 connected together to form a closed ring. The ring segments are ideally fastened together in a way that allows them to be disconnected. In the example shown the ring segments 40 can be connected to each other in the axial direction and can be locked together to secure each other.

Figure 7:
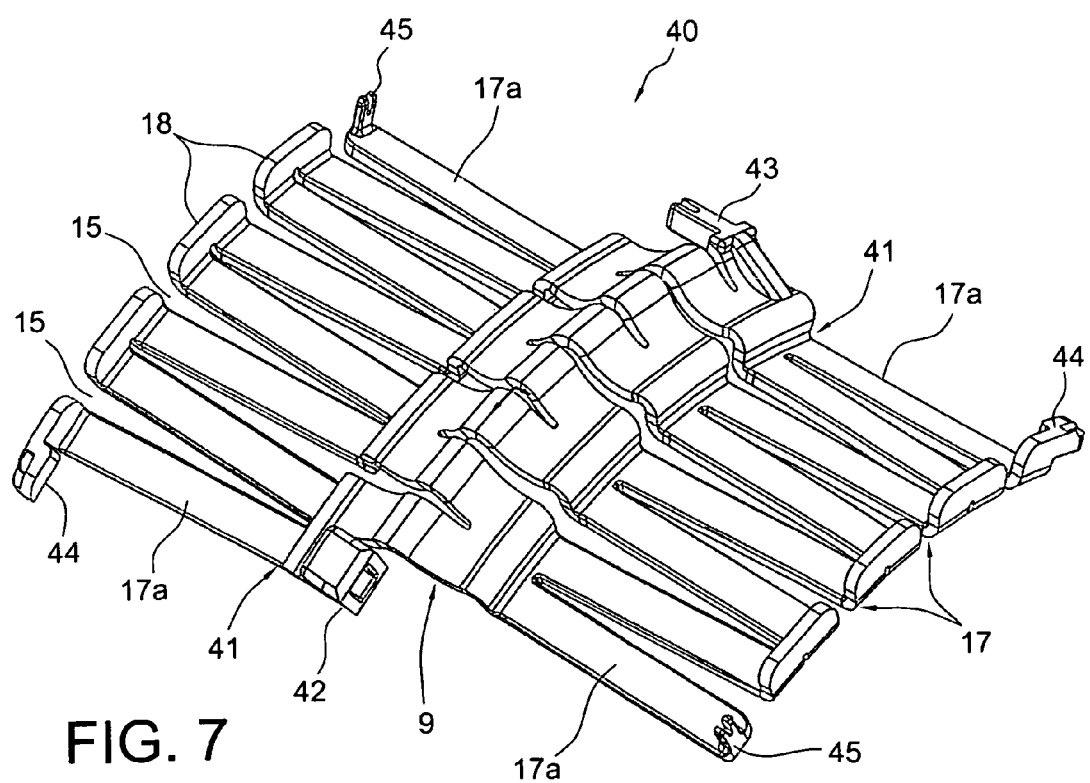
FIG. 7 A view of a single ring segment of the arrangement shown in FIG. 6.

As shown in FIG. 7, the ring segments 40 which can be connected to each other in the axial direction are stepped around their opposite encircling edges in the central section 50 to produce diametrically opposite encircling projections 41. In the area of the step in the central section there are inter-connecting organs which take the form of a socket 42 on the one side and on the other a connecting tongue 43 which can be inserted into the socket 42 in a neighbouring ring segment 40. These connecting organs are designed in such a way that they produce a mutually locking connection. At the axial ends of the elements which limit the diametrically opposite steps there are also connecting organs in the form of eyelets 44 and connecting tongues 45 which, in contrast to the connecting organs 42, 43 which extend in the axial direction can be moved in a radial direction to connect to corresponding connecting organs in the neighbouring ring segments which is possible as a result of the spring-loaded properties of the axial projections or in this case partial projections 17a. The step mentioned above has been selected in such a way that it encircles one-half of a projection 17 which is limited by notches 15 at the side. The partial projections 17a assigned to the opposite connecting elements 44, 45 are therefore offset to each other by half a projection's width. The connecting elements 44, 45 can also ideally be locked to each other so as to secure each other.

In the example shown all the projections 17 have end pieces 18 which point radially outwards. At the same time, as can best be seen in FIG. 6, there are radial bumps 46 on the inside in the form of studs or the like which can pressed into the external surface of the sealing sleeve 3 to achieve a mutually securing joint.

Figure 11:
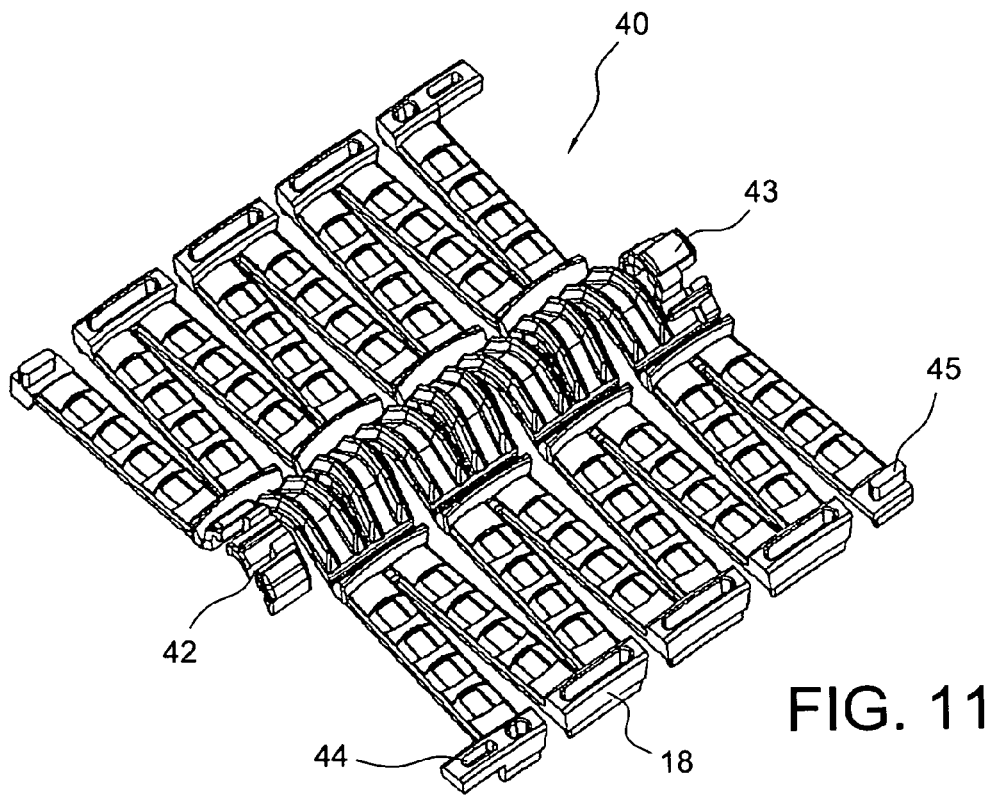
FIG. 11 An alternative to the version shown in FIG. 7.
Figure 12:
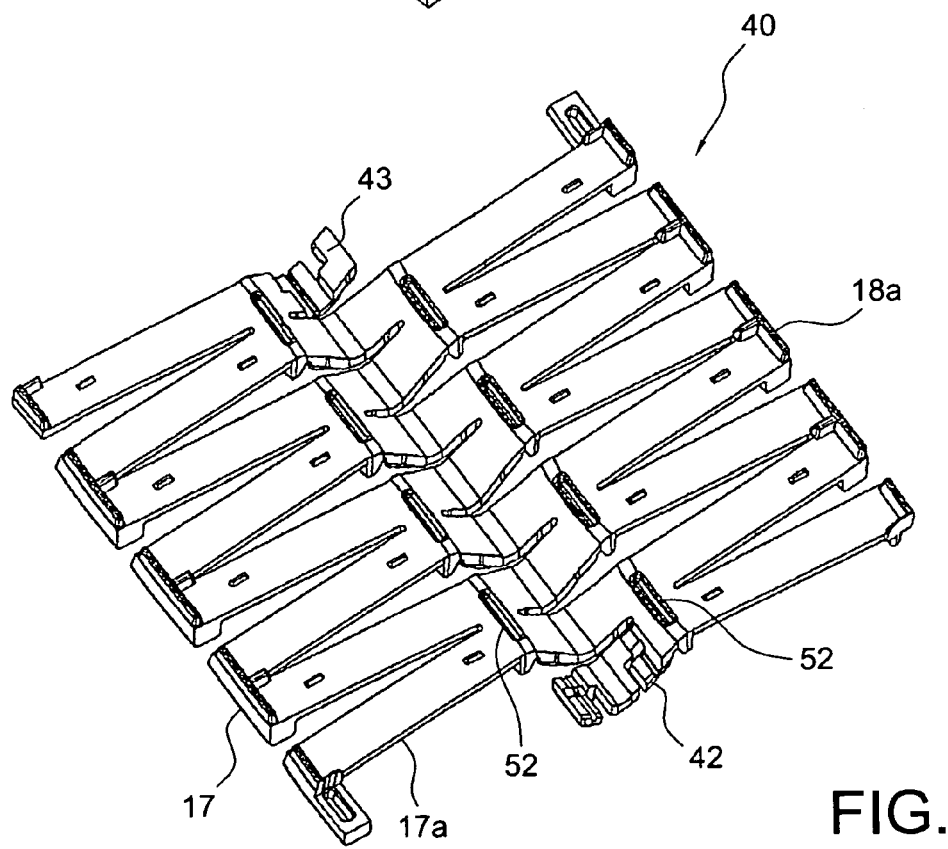
FIG. 12 An internal view of the arrangement shown in FIG. 11.

FIGS. 11 and 12 show a similar version to FIGS. 6 and 7. To prevent repetition, therefore, only the differences will be described in more detail wherein identical reference numbers will be used for the same parts. In the version shown in FIGS.

Figure 13:
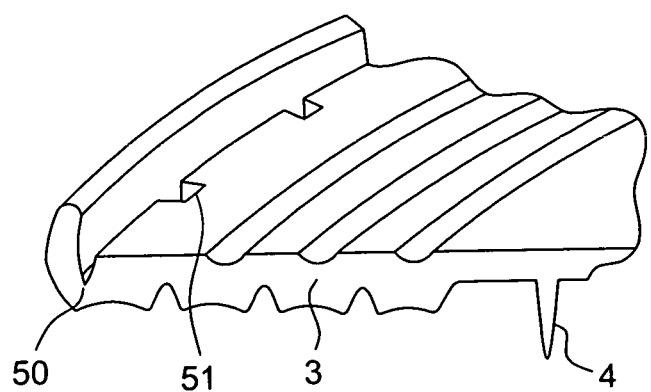
FIG. 13 A cross-section through a sealing sleeve suitable for the version shown in FIGS. 11 and 12.

11 and 12 the connecting organs in the central section in the form of a connecting socket 42 and connecting tone 43 are arranged in such a way that during the assembly of the consecutive segments 40 they can be connected to each other around the circumference which makes assembly easy. The connecting organs at the axial ends of the partial projections 17a in this case in the form of eyelets 44 and journals 45 can be engaged in a radial direction for a central connection. FIGS. 11 and 12 also show that the strip-shaped end pieces 18 located at the axial ends of the projections 17 and 17a which close the internal slots not only have a bumper which points radially outwards but also a bump which faces radially inwards. As shown in the example and best seen in FIG. 12, this takes the form of a T-shaped strip 18a whose leg can engage with the corresponding recesses in a sealing sleeve 3. As FIG. 13 shows, the corresponding sealing sleeve 3 has a groove 50 encircling its edge and notches 51 starting from this groove in which the T-shaped strips 18 of the projections 17, 17a can engage. This helps to achieve a jointly deformable composite body formed by the sealing sleeve 3 and the fixing sleeve 8.

Figure 14:
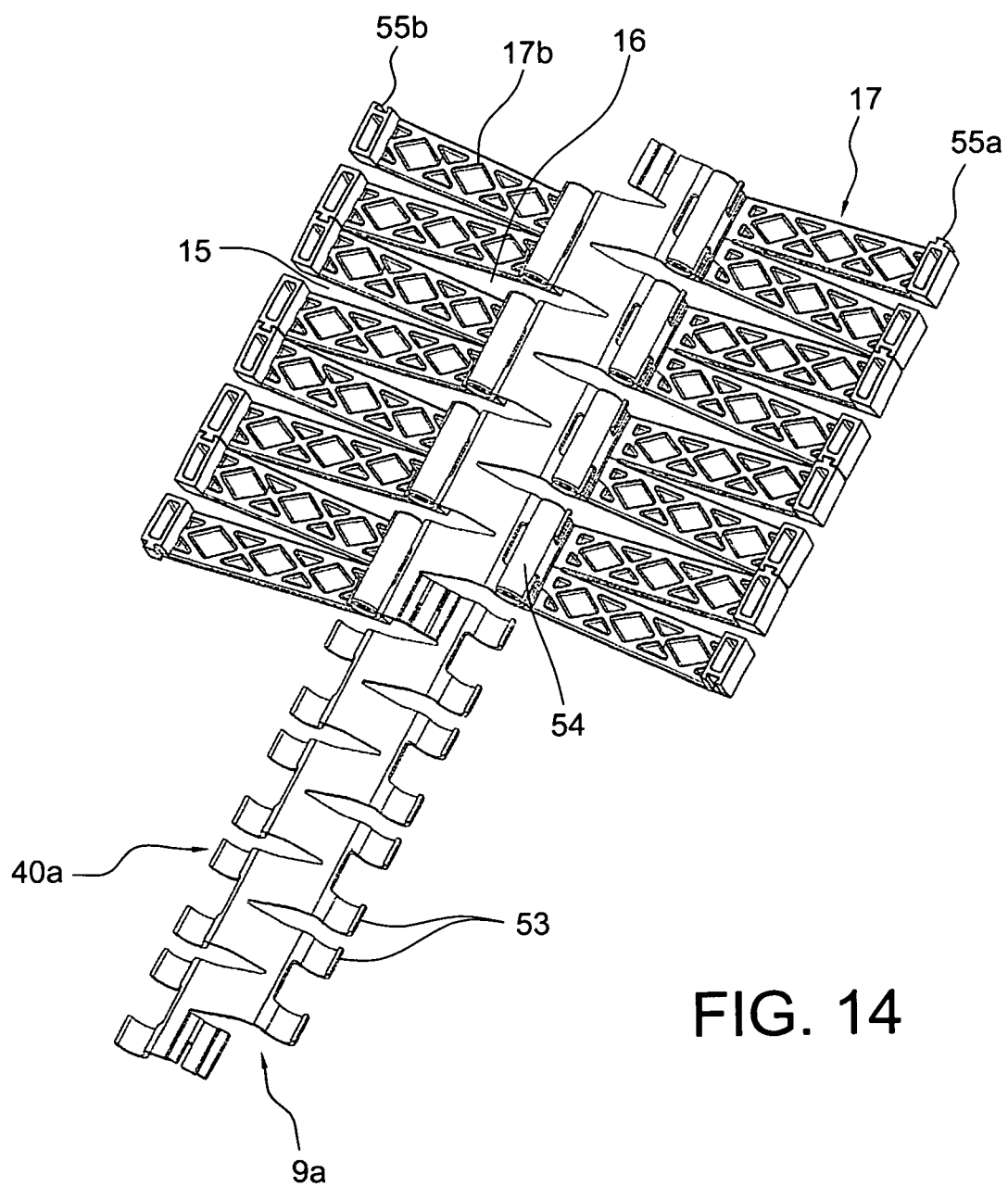
FIG. 14 An example of a version with axial projections connected to the central section by joints.
Figure 15:
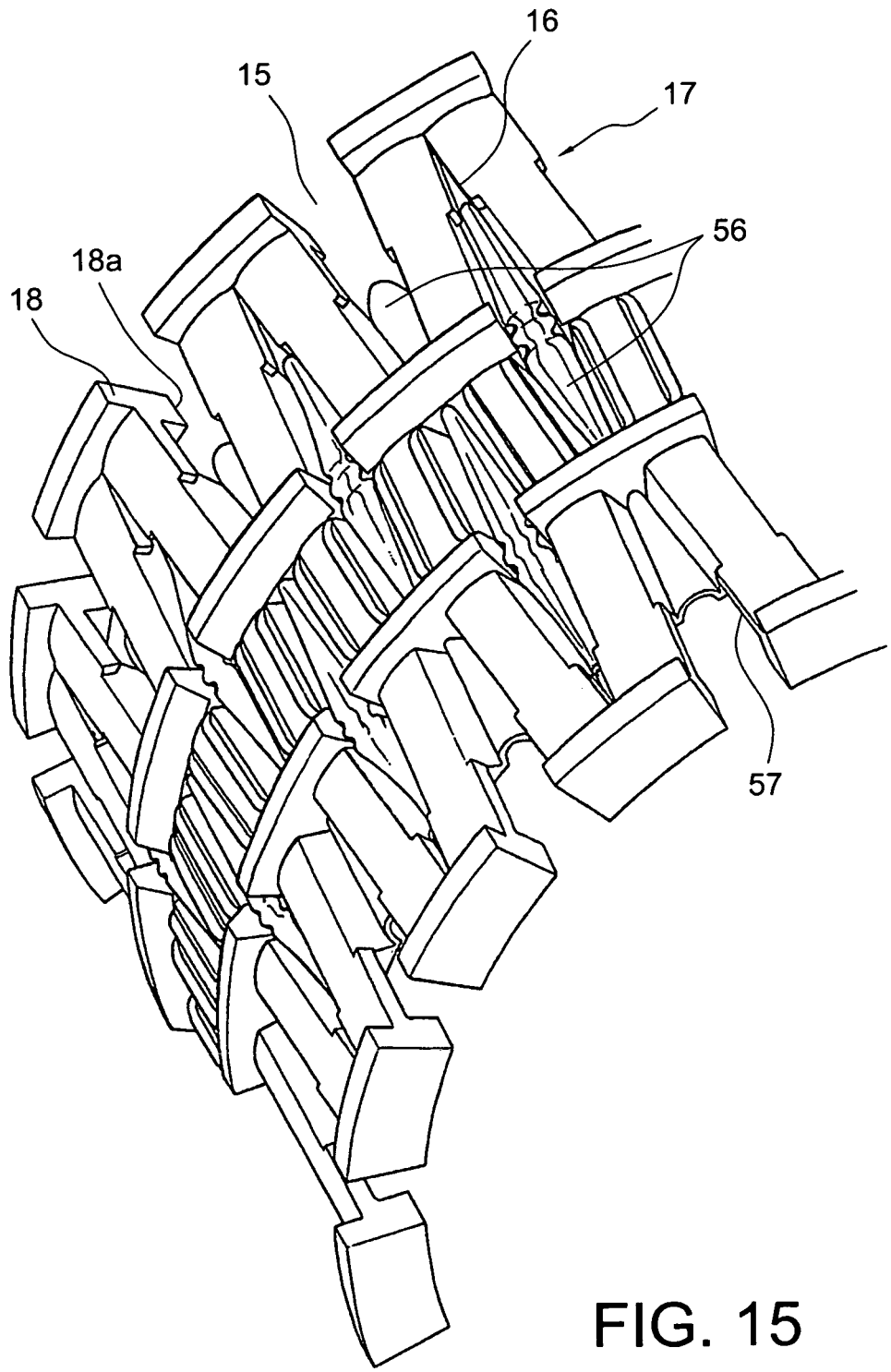
FIG. 15 A view of a fixing sleeve with expansion slots closed by bellows-type membranes.

FIGS. 11 and 12 also show that at the ends of the axial projections 17, 17a in the central section ends, in other words where the projections connect to the central section, there are target bending areas formed by weakened areas, in this case in the form of passage holes 52. It would also be conceivable, of course, to use joint connections instead of these target bending areas. A version of this type is shown in FIG. 14. FIG. 14 shows a material strip 9a which forms the central section 9 of the fixing sleeve 8 which has axial edge notches running in opposite directions on both sides and from which these flanking joint claws 53 project. Top form the side contact sections 10, 11, this version has two-legged projections 17 whose legs are connected to each other at the ends near the central section by means of a cylindrical section 54 which forms an articulated joint and which can be locked into corresponding joint claws 53 to form a hinge joint. The legs 17b facing each other of the neighbouring two-legged projections 17 can be connected to each other by a connector so that slots which supplement the internal slots 16 are formed with the edge notches in the strip of material 9a. The slots between the legs 17b of the two-legged projections 17 produce edge notches 15 which extend to the central section. To make the connection mentioned above the legs 17b feature alternate male connection projections 55a and matching female connection recesses 55b. The cylindrical sections for forming the articulated joints can ideally take the form of hollow shafts. The ends of the material strip 9a which forms the central section may be welded or connected to each other to form a ring. In the version shown in FIG. 14 the material strip 9a is formed by several inter-connecting segments 40a wherein the connecting organs may be identical to the connecting organs 42, 43 used in the version shown in FIGS. 11 and 12.

The fixing sleeves 8a and 8b made up of several interlocking segments have the common feature that the required size can be altered by changing the number of segments used. This results in a very high level of flexibility.

Another concept of the invention is expressed in FIGS. 15 to 18. In versions of the type shown in these figures there is no need for a sealing sleeve 3 yet nevertheless a sealed connection can be achieved. The basic structure of the arrangement shown in FIGS. 15 to 18 is essentially the same as the arrangement shown in FIGS. 10 and 11. Therefore, to avoid repetition, only the differences will be highlighted in the following wherein the same reference numbers will be used for the same parts. In contrast to the arrangement shown in FIGS. 10 and 11, no inter-connected ring segments are used in this case and instead a ring is used which is welded or glued at its ends or one which is made up of a single piece. It would also be conceivable to form the encircling ring by welding or gluing together consecutive segments. In the version shown in FIGS. 15 to 17 the expansion slots in the form of edge notches 15 and internal slots 16 are bridged by membranes 56 designed as bellows. These therefore form a moving seal.

Figure 16:
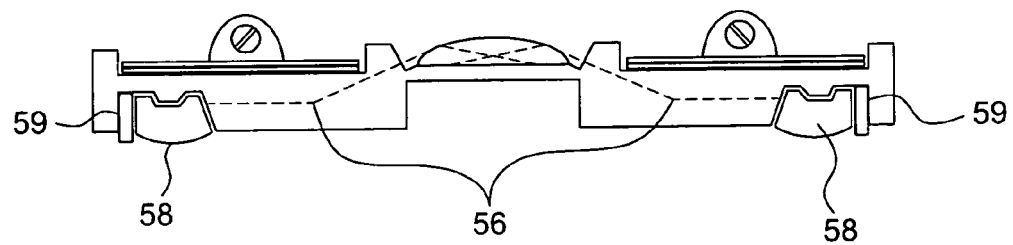
FIG. 16 A cross-section through the arrangement shown in FIG. 15.
Figure 17:
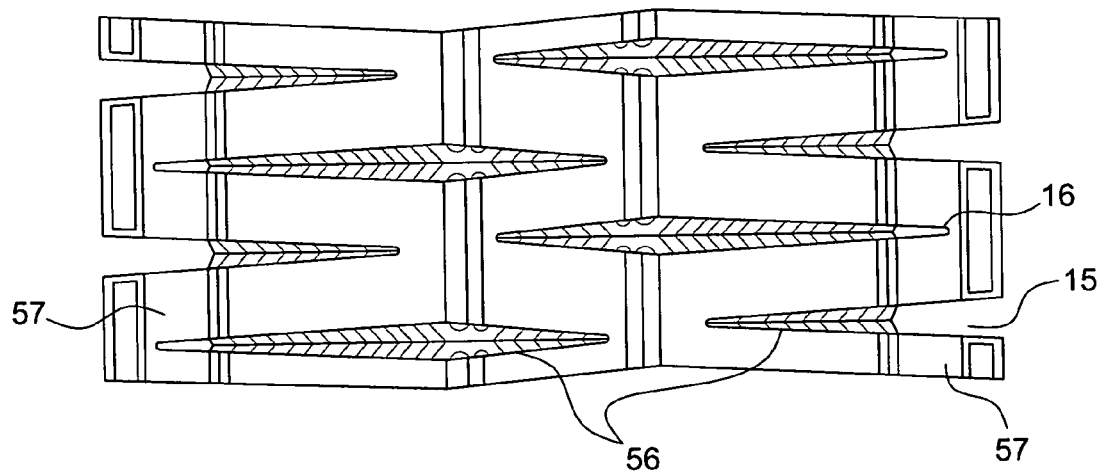
FIG. 17 A plan view of the arrangement shown in FIG. 15 from the inside.

In the area of the axial ends of the projections 17 which face away from each other there are encircling channels 57 at which the membranes 56 end. As can best be seen in FIG. 16, encircling sealing rings 58 can be fitted in the channels 57 which press against the fronts of the bellows-type membranes which face each other and therefore form a side seal of the internal chamber enclosed by the membranes 56. The channels 57 are conically constricted in the fitting direction of the sealing rings 58 so that sealing rings 58 whose cross-sections are tailored to this, when they are pressed into the relevant channel 57, press against the open front of the membranes 56 as can be seen in FIG. 16. In the example shown the side flank of the channels 57 next to the membranes 57 and the sealing rings 58 are angled away from the direction in which they press. The opposite side flanks of the channels 57 may run in a radial direction. A retaining ring 59 in the form of a split ring may be placed in the axial direction behind each sealing ring 58 for stabilisation purposes. This may have a jagged or meshed radial internal edge which will facilitate the production of a joint with tensile strength. The thickness of the sealing rings 58 is such that they come into contact with the external circumference of the neighbouring pipe to form a seal. This means that the butt joint area between the pipes 1, 2 which are to be connected is reliably sealed so that there is no need for a sealing sleeve.

Figure 18:
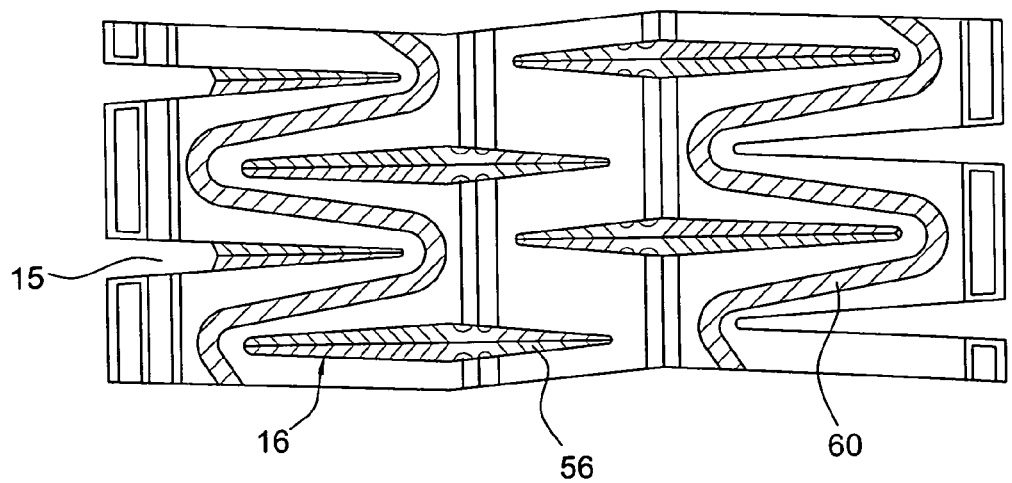
FIG. 18 An alternative to the version shown in FIGS. 15 to 17.

In the version shown in FIG. 18 only the internal slots 16 are bridged by a bellows-type membrane 56. At the same time, on each contact section 10, 11 there is a meandering seal 60 inserted between the internal ends of the edge notches 15 which do not have a membrane and the external ends of the internal slots 16 which have been bridged by a membrane 56. This may take the form of an endless sealing cord which is inserted into a corresponding channel.

Although the above describes some possible examples of the invention the examples are by no means exhaustive. In fact the expert in the field has a whole range of possibilities at his disposal to adjust the general concept of the solution proposed by the invention to suit the requirements of the individual case.

What is claimed is:

1. A sleeve arrangement for connecting two pipes which have different external diameters, such sleeve arrangement, comprising:
   circumferential tensioning clips associated with the two pipes;
   at least one fixing sleeve having, two opposite outer edges, cylindrical contact areas defining receiving channels for accommodating said circumferential tensioning clips, a middle section and axial slots: and
   a sealing sleeve, encompassed by said at least one fixing sleeve, having cylindrical contact areas for association with the two pipes and for adjustment to the different diameters of the two pipes, and with a middle section, wherein:
   said cylindrical contact areas of said sealing sleeve being connected by said middle section of said sealing sleeve which according to the difference in external diameters of the two pipes can be brought into a conical shape, with said cylindrical contact areas of said sealing sleeve adjacent to the external circumference of the two pipes being movable into direct contact with both pipes:

said at least one fixing sleeve configured as a closed, circumferential ring designed for a three-dimensional change of shape, said ring forming said at least one fixing sleeve configured as a spring cage which is on either side provided with said axial slots distributed around its entire circumference and associated with said middle section of said at least one fixing sleeve, and said cylindrical contact areas of said at least one fixing sleeve, said spring cage allowing sufficient space along its entire length to undergo a three dimensional change in shape, and with said middle section of said at least one fixing sleeve being connected with said cylindrical contact areas by at least one of: lateral bending areas and joints.

2. The sleeve arrangement in accordance with claim 1, wherein:

said axial slots are provided so that on either side of said spring cage forming said at least one fixing sleeve said axial slots are open at said two opposite outer edge of said at least one fixing sleeve, and extend to said middle section of said at least one fixing sleeve;

alternating therewith, they are closed at the outer edge of said at least one fixing sleeve, and extend at least across a major part of said middle section of said at least one fixing sleeve; and with said closed end axial slots of one side being arranged opposite said open end axial slots of the other side.

3. The sleeve arrangement in accordance with claim 2, wherein:

said axial slots have projections formed at their outer ends extending radially and forming said closed ends.

4. The sleeve arrangement in accordance with claim 3, wherein:

said sealing sleeve has at least one end face and associated recesses; and said projections engage said sealing sleeve at least one of: said at least one end face and engage associated recesses of said sealing sleeve.

5. The sleeve arrangement in accordance with claim 3, wherein:

said projections have an inner side are provided with radial elevations which can be pressed into an associated sealing sleeve.

6. The sleeve arrangement in accordance with claim 1, wherein:

said middle section of said at least one fixing sleeve comprises lateral rim webs including a radial inner end, and a middle web which, similar to said lateral contact areas, in the area of said radial inner end of the lateral rim web joins the latter.

7. The sleeve arrangement in accordance with claim 1, wherein:

said spring cage forming said at least one fixing sleeve consists of a casting and/or punched part whose ends are firmly connected with each other.

8. The sleeve arrangement in accordance with claim 1, wherein:

the sleeve arrangement comprises only said fixing sleeve and that at least the expansion and compression slots, respectively, extending across the middle section of the fixing sleeve, are bridged by a membrane, and further that each contact area projecting from the middle section is associated with a seal contacting the associated pipe.

9. The sleeve arrangement in accordance with claim 8, wherein:

said at least one fixing sleeve has inner slots; and only said inner slots are bridged by said membrane and that sealing string is provided between the inner slots bridged by an associated membrane, and free rim slots.

10. The sleeve arrangement in accordance with claim 9, wherein:

expansion and/or compression slots are formed by said rim slots; and all expansion and/or compression slots and the inner slots are bridged by a membrane; and that in the area of the ends of the contact areas pointing away from the middle section provision is made for a circumferential sealing ring which is insertable into an associated channel, such sealing ring contacting end faces, which are open on the channel side, of the adjacent membranes.

11. The sleeve arrangement in accordance with claim 10, wherein:

the sealing ring and the associated channel have a cross-section narrowing towards a channel bottom.

12. The sleeve arrangement in accordance with claim 3, wherein:

said spring cage forming said fixing sleeve consists of several ring segments which can be joined to form a ring, with the middle section and the axial projections of mutually adjacent ring segments being at least one of: insertable into each other and lockable with each other by means of plug-type connections preferably extending in mutually plug-in transverse directions.

13. The sleeve arrangement in accordance with claim 1, wherein:

said middle section is elevated relative to said lateral contact areas.

14. A sleeve arrangement for connecting two pipes which have different external diameters, such sleeve arrangement, comprising:

circumferential tensioning clips associated with the two pipes;

at least one fixing sleeve accommodating said circumferential tensioning clips; and a sealing sleeve, encompassed by said fixing sleeve, with said sleeve and said fixing sleeve having cylindrical contact areas for association with the two pipes and for adjustment to the different diameters of the two pipes, and with a middle section, wherein:

said cylindrical contact areas being connected by said middle section which according to the difference in diameters can be brought into a conical shape, with said cylindrical contact areas of the sleeve adjacent to the external circumference of the two pipes being movable into direct contact with both pipes said contact areas of said fixing sleeve comprising circumferential receiving channels associated with said tensioning clips; and said fixing sleeve configured of circumferential segments following one another in a circumferential direction and joined to one another with a rotary degree of freedom relative to a radial axis, with each of the said circumferential segments having an elevated middle web with which they are insertable to one another in a circumferential direction thus forming a swivel joint, and with the middle web being connected via bending areas with laterally projecting lateral wings forming said contact areas.

15. The sleeve arrangement in accordance with claim 14, wherein:

said middle web of the circumferential segments is on one side provided with a plug-in receptacle and on the other side with a plug-in tongue adapted thereto which comprises convexly bent longitudinal sides.

16. The sleeve arrangement in accordance with claim 14, wherein:
the lateral wings are provided with radially extending projections which are engageable with at least one of: associated recesses and notches of a sealing sleeve.

17. A device in accordance with claim 1, wherein:
each of said tensioning clips having an area of one end and an area of the other end; and
each of said tensioning clips consist of at least two segments adding up to an angle of more than 360°, with one segment in said area of one end thereof being provided with at least one tensioning belt embracing the other segment, and in said area of the other, end thereof with at least one holder or tensioner associated with the adjacent free end of a tensioning belt facing the latter.

18. The sleeve arrangement in accordance with claim 1, wherein:
said sealing sleeve has axial ends; and
provision is made for said sealing sleeve, in the area of said axial ends having at least one of: a circumferential groove and notches distributed around its circumference which are engaged by associated radial projections of said at least one fixing sleeve.

19. The sleeve arrangement in accordance with claim 18, wherein:
said sealing sleeve is provided with a stop face for the pipe having the larger external diameter.

\* \* \* \* \*